April 10, 1962 D. R. HEWITT 3,028,651
GLASS AND CEMENT BLOCK MACHINE
Filed Feb. 18, 1959 3 Sheets-Sheet 2

INVENTOR.
Donald R. Hewitt
BY *Victor J. Evans & Co.*
ATTORNEYS

April 10, 1962 — D. R. HEWITT — 3,028,651
GLASS AND CEMENT BLOCK MACHINE
Filed Feb. 18, 1959 — 3 Sheets-Sheet 3
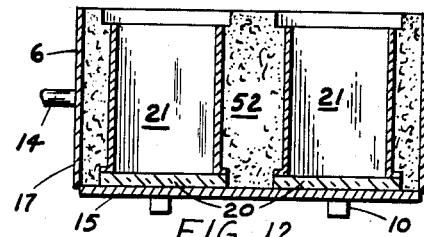
FIG. 10
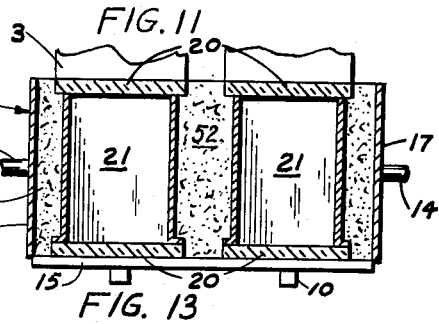
FIG. 11
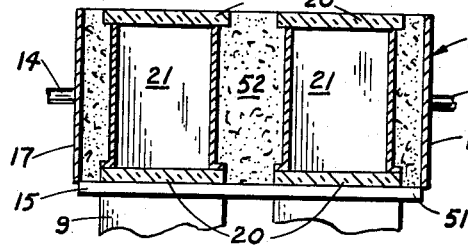
FIG. 12
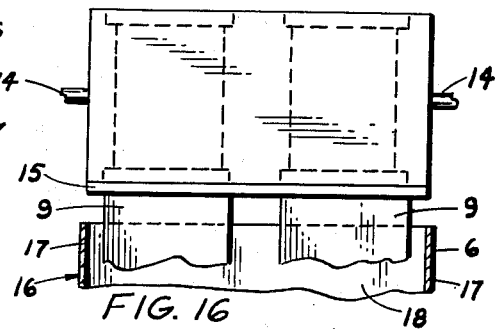
FIG. 13
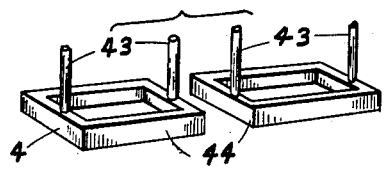
FIG. 14
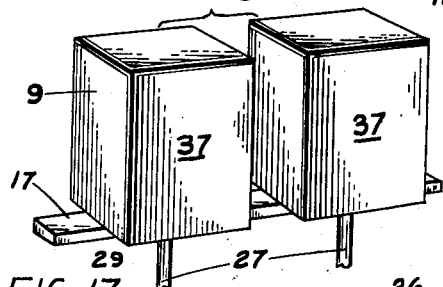
FIG. 16
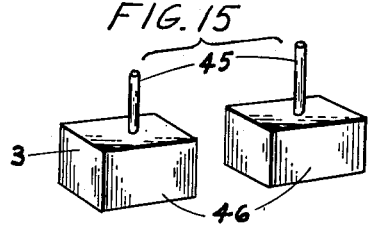
FIG. 15
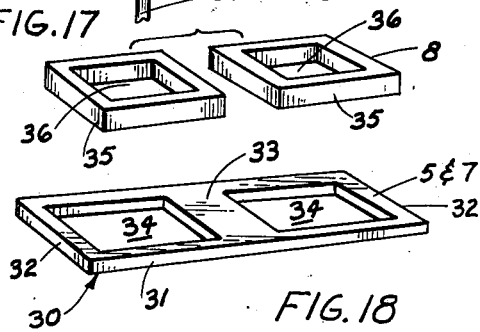
FIG. 17
FIG. 18
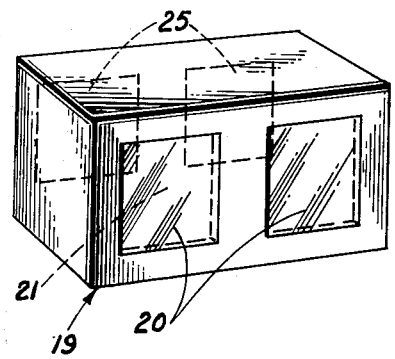
FIG. 19
INVENTOR.
Donald R. Hewitt
BY Victor J. Evans & Co.
ATTORNEYS

United States Patent Office 3,028,651
Patented Apr. 10, 1962

3,028,651
GLASS AND CEMENT BLOCK MACHINE
Donald R. Hewitt, 2 Lakeview Ave.,
Muskegon Heights, Mich.
Filed Feb. 18, 1959, Ser. No. 794,129
1 Claim. (Cl. 25—41)

This invention relates to a machine for making building blocks, and more particularly to a machine for making building blocks of the type which have glass faces or slabs as an integral part thereof.

The object of the invention is to provide a means for making building blocks wherein the completed building blocks will be provided with glass panels or slabs therein.

Another object of the invention is to provide a machine for making faced building blocks wherein such building blocks can be turned out quickly and easily and accurately.

A further object of the invention is to provide a machine for making glass faced building blocks wherein the machine can be conveniently operated by one or more persons in such a manner that a plurality of glass faced building blocks can be conveniently formed in the shortest possible time and with a minimum of effort.

A further object of the invention is to provide a machine for making glass faced building blocks which is extremely simple and inexpensive to manufacture.

Other objects and advantages will be apparent during the course of the following description.

In the accompanying drawings, forming a part of this application, and in which like numerals are used to designate like parts throughout the same.

FIGURES 2–13 are views illustrating the various steps in forming a glass faced building block according to the present invention.

FIGURES 14–18 are perspective views illustrating certain parts of the machine.

FIGURE 19 is a perspective view illustrating one of the finished building blocks having the glass faces or panels therein.

Figure 1:
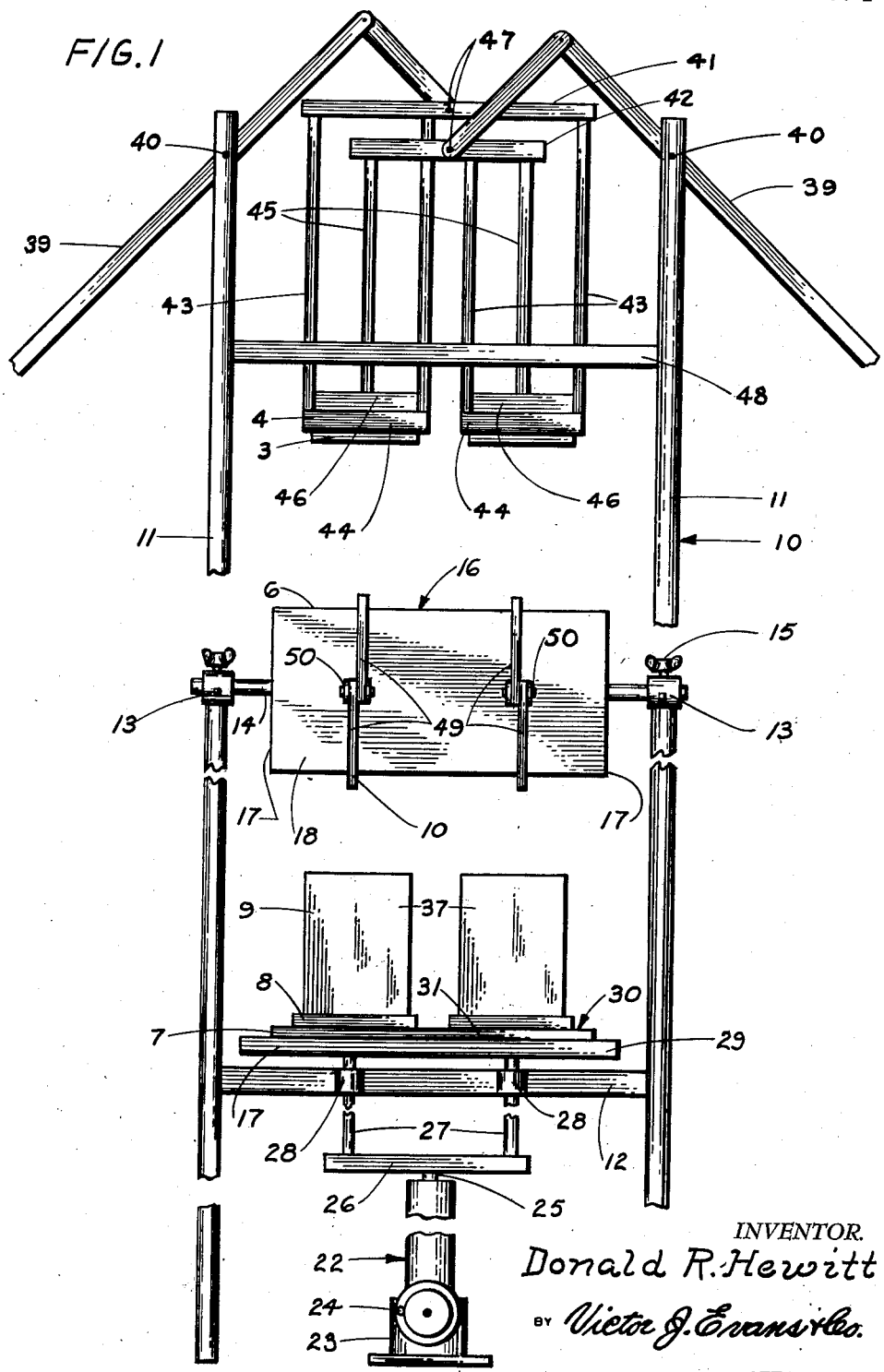
FIGURE 1 is an elevational view illustrating the building block machine of the present invention.
Figure 2:
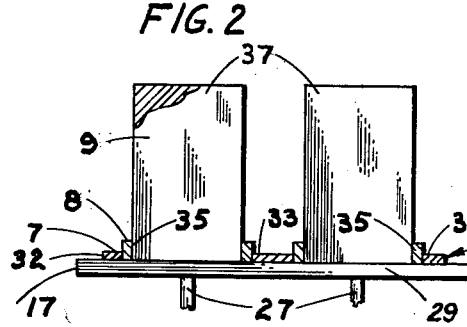

Referring in detail to the drawings, the numeral 10 indicates the machine of the present invention for making faced building blocks, and the machine 10 comprises a frame which includes a pair of vertically disposed upright members 11. A horizontally disposed crosspiece 12 extends between the upright members 11 and is secured thereto, and supported by the upright members 11 are bearings 13. Trunnions 14 are pivotally or rotatably supported by the bearings 13, and screw members 15 are provided for maintaining the trunnions 14 properly connected in the bearings 13.

The numeral 16 indicates a hollow rotary support member which is mounted for rotary or pivotal or swinging movement about a horizontal axis extending through the pair of opposed trunnions 14. The support member 16 includes spaced parallel vertically disposed end pieces 17 as well as spaced parallel vertically disposed side pieces 18. The top and bottom of the support member 16 are open, for a purpose to be later described.

Referring to FIGURE 19 of the drawings, there is illustrated one of the completed faced building blocks which is indicated generally by the numeral 19, and it will be seen that the block 19 includes spaced apart glass panels or slabs 20 which are arranged in registry or alinement with spaces or openings 21 in the block 19, and the machine of the present invention is adapted to be used for making blocks such as the block 19.

There is further provided a lifting and lowering device which is indicated generally by the numeral 22, and this device 22 is adapted to be supported on a supporting structure 23 and is arranged adjacent the lower end of the machine 10 and is positioned between the support members 11, as shown in FIGURE 1. The device 22 includes a crank 24 which may be operated by hand or which may be operated by a motor, and a movable member 25 is adapted to be moved up and down as the member 24 is actuated. A horizontally disposed movable platform 26 is connected to the upper end of the member 25, and spaced parallel vertically disposed rods 27 project upwardly from the platform 26. The rods 27 extend through bearings or guide members 28 in the crosspiece 12, and the rods 27 have their upper ends connected to a horizontally disposed movable bar 29.

As shown in the drawings, a rectangular body member 30 is supported on the bar 29, FIGURE 18, and the body member 30 includes longitudinally extending spaced parallel side members 31, as well as spaced parallel end members 32 and an intermediate member 33, and these members coact to define therebetween a pair of rectangular openings 34.

Also supported on the bars 17 are rectangular dies 35 which have their central portions open as at 36, and the dies 35 are seated in the openings 34 in the body member 30.

The numeral 37 designates each of a pair of similar rectangular cores which have their lower portions seated in the openings 36 of the dies 35, and the cores 37 are mounted for movement into and out of engagement with the support member 16, and these cores 37 can move upwardly through the open bottom portion of the support member 16 as the device 22 is actuated.

In certain instances a liner such as the liner 38 may be positioned in the spaces 21 of the blocks 19 when desired, and these liners 38 may be made of any suitable material.

As shown in FIGURE 1, there is further provided a pair of manually operable similar levers 39 which are pivotally connected to the upper ends of the uprights 11 by means of pivot pins 40. These levers 39 are pivotally connected to horizontally disposed movable links 41 and 42 by means of pins 47. Depending from the links 41 are vertically disposed movable arms 43 which have rectangular open base members 44 secured to their lower ends. Arms 45 depend from the links 42, and plungers 46 are secured to the lower ends of the arms 45, and these plungers are shown in detail in FIGURE 15.

As shown in the drawings a brace 48 may extend between the uprights 11 and suitable braces can be used wherever desired or required.

The numeral 49 indicates movable hooks which each have a substantially L-shape, and the hooks 49 are hingedly connected as at 50 so that these hooks 49 can be moved to open or closed position. The numeral 51 indicates a plate which can be used for helping retain the parts in their proper position, and the numeral 52 indicates the cement or cementitious material which is placed in the support member 16 for forming the blocks. This cementitious material may be poured from a hopper or the like.

From the foregoing, it is apparent that there has been provided a method of and apparatus for making a faced building block such as the block 19. It is to be noted that the block 19 includes a pair of similar hollow spaces 21 as well as glass facing panels 20. Such a block can be used for any desired purpose, as for example it can be used in the construction of store fronts, dwellings or wherever desired.

The blocks 19 can be made quickly and accurately and wherein a minimum amount of effort and labor is required to form the blocks.

Figure 3:
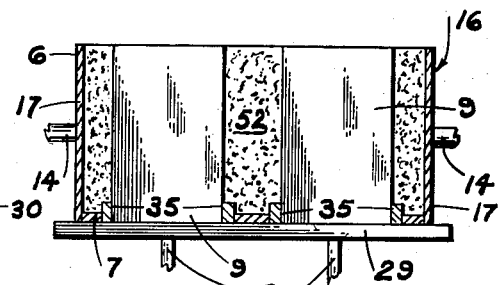
Figure 4:
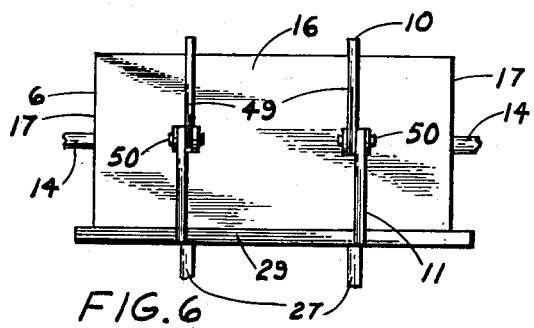
Figure 5:
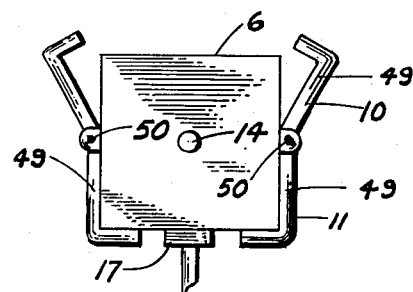
Figure 6:
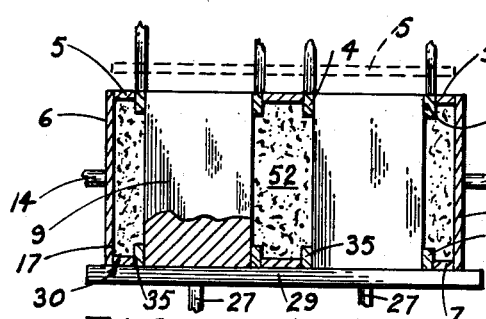
Figure 8:
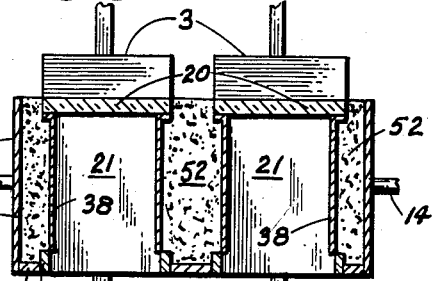
Figure 7:
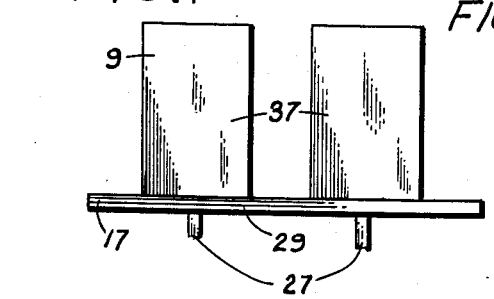
Figure 9:
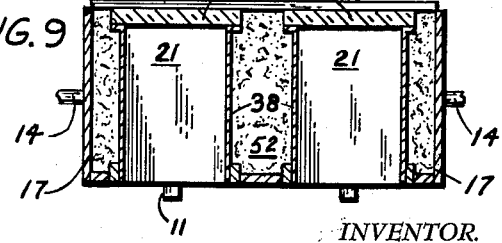

In use and with the parts arranged as shown in FIGURE 1, it will be seen that the device 22 can be actuated so as to cause the member 25 to move vertically. It will be seen that as the members 27 and 26 are moved upwardly by the member 25, the bar 29 will move upwardly so as to carry the cores 30 upwardly whereby these cores 30 will move in through the open bottom portion of the support member 16. Then, cement such as the cement 52 can be placed in the support member 16 and this cement will fill the support member 16 around the cores 37. In view of the fact that the dies 35 and body member 30 are positioned on the bar 29, it will be seen that as for example as shown in FIGURE 3 a space will be provided around the lower portions of the cores 37. Thus, the dies 35 will define a space so that after the dies 35 are removed, a glass panel such as the panel 20 can be positioned in the space provided by the die 35 and cement can be placed in the space defined by the body member 30 so that this cement will retain the glass panels in the proper position. After a predetermined period of time, the device 22 can be lowered so as to remove the cores 37 from the support member 16 whereby the hollow spaces 21 will be provided.

In certain instances liners such as the liners 38 can be inserted, and such liners will increase or enhance the attractiveness or usefulness of the completed blocks.

Due to the fact that the trunnions 14 provide a rotary support for the member 16, it will be seen that after the cores 37 are moved to their lowered position, the support member 16 can be rotated one hundred and eighty degrees and then the levers 39 can be actuated so as to move the members 44 and 46 downwardly so as to provide spaces which can also be used for receiving glass panels 20. Thus, the completed building block 19 will have two glass panels 20 on each side thereof which will provide a highly useful and ornamental building block.

The parts can be made of any suitable material and in different shapes or sizes.

The hooks 49 can be used for maintaining the parts in their proper position as long as desired, and then these hooks can be released. The blocks can be made with or without the liners 38, and the completed blocks may be made with different dimensions as desired.

In actual practice, cement 52 is placed in the hopper which is on tracks, and this is pushed over the top of the box 16, and the cement is released from the hopper through a sliding door in the bottom of the hopper so as to drop the cement in the box 16 and then the hopper can move to or away from the box 16.

When one of the levers is actuated, after the cement 52 is packed to the proper hardness in the box 16, releasing of this lever forces the dies 44 into the already packed cement so as to make an extra hard shelf which the glass 20 rests on. When the other lever is used or released, it moves member 46 to a position on top of the glass 20. Cement 52 is then filled around the member 46 and packed to the right hardness, and then this lever is pulled down so as to lift the member 46 up and away and leave the cement 52 to hold the glass in position.

Minor changes in shape, size and rearrangement of details coming within the field of invention claimed may be resorted to in actual practice, if desired.

I claim:

In a machine for making faced blocks, a frame including spaced apart vertically disposed upright members, a horizontally disposed crosspiece extending between said upright members, opposed bearings supported by said upright members, trunnions pivotally supported by said bearings, screw members for maintaining the trunnions properly connected in the bearings, a hollow rotary support member connected to said trunnions and mounted for swinging movement about a horizontal axis, said support member including spaced parallel vertically disposed end pieces and spaced parallel vertically disposed side pieces, a lifting and lowering device supported adjacent the lower portion of said frame and interposed between said upright members, a horizontally disposed vertically movable platform actuated by said lifting and lowering device, spaced parallel vertically disposed rods extending upwardly from said platform, a horizontally disposed bar connected to the upper ends of said rods; a rectangular body member supported on said bar and including spaced parallel side members, spaced parallel end members, and an intermediate member, said members defining therebetween a pair of similar rectangular openings; rectangular open dies arranged in said last named openings and having their central portions open, a pair of spaced parallel rectangular cores supported on said bar and having their lower portions seated within said dies; L-shaped levers pivotally connected to the upper ends of said upright members, links connected to said levers, arms depending from said links, rectangular open base members connected to the lower ends of certain of said arms, and plungers connected to the lower ends of the other arms.

References Cited in the file of this patent

UNITED STATES PATENTS

| 700,746 | Davies | May 27, 1902 |
| 803,092 | Bueckermann | Oct. 31, 1905 |
| 1,359,899 | Keel | Nov. 23, 1920 |
| 1,496,027 | Schuck | June 3, 1924 |
| 2,003,702 | Straub | June 4, 1935 |
| 2,115,264 | Henderson | Apr. 26, 1938 |
| 2,152,569 | Root et al. | Mar. 28, 1939 |
| 2,426,796 | Stadelhofer | Sept. 2, 1947 |

FOREIGN PATENTS

| 928,198 | Germany | May 26, 1955 |